United States Patent [19]

Murari

[11] Patent Number: 5,774,694
[45] Date of Patent: Jun. 30, 1998

[54] METHOD AND APPARATUS FOR EMULATING STATUS FLAG

[75] Inventor: Srinivasan Murari, Fremont, Calif.

[73] Assignee: Intel Corporation, Santa Clara, Calif.

[21] Appl. No.: 719,620

[22] Filed: Sep. 25, 1996

[51] Int. Cl.$^6$ .......................... G06F 9/455; G06F 9/302; G06F 9/305

[52] U.S. Cl. ...................... 395/500; 395/376; 395/379; 395/385

[58] Field of Search .................................. 395/500, 375, 395/800, 376, 377, 378, 379, 380, 381, 382, 383, 384, 385, 386, 387, 388, 389

[56] References Cited

U.S. PATENT DOCUMENTS

| | | | |
|---|---|---|---|
| 4,415,969 | 11/1983 | Bayliss et al. | 364/200 |
| 5,327,537 | 7/1994 | Corcoran et al. | 395/375 |
| 5,440,749 | 8/1995 | Moore et al. | 395/800 |
| 5,493,687 | 2/1996 | Garg et al. | 395/800 |
| 5,590,359 | 12/1996 | Sharangpani | 395/800 |
| 5,689,720 | 11/1997 | Nguyen et al. | 395/800 |

*Primary Examiner*—Kevin J. Teska
*Assistant Examiner*—Russell W. Frejd
*Attorney, Agent, or Firm*—Blakely, Sokoloff, Taylor & Zafman

[57] ABSTRACT

A method and apparatus for emulating status flags on a computer system that has no native support for status flags. One embodiment of the invention includes decoding an arithmetic instruction executable on a first Instruction Set Architecture (ISA), wherein the instructions generates at least one status flag when executed on the first ISA. The arithmetic instruction is translated to be executable on a second ISA. When executed on the second ISA, the translated arithmetic instruction generates a first intermediate result by performing a first logical exclusive-or (XOR) operation between a first operand and a second operand. The arithmetic instruction then generates a first final result by performing a second XOR operation between the first intermediate result and an arithmetic result, which was generated by an arithmetic operation specified by the arithmetic instruction. As a result, the first final result has at least one bit representing a status flag of the arithmetic result.

30 Claims, 4 Drawing Sheets

FIG. 4A
```
      A  0000 1111 1111 1111 1111
    + B  0000 0000 0000 0000 0001
      C  0001 0000 0000 0000 0000
```

FIG. 4B
```
        A  0000 1111 1111 1111 1111
    XOR B  0000 0000 0000 0000 0001
        D  0000 1111 1111 1111 1110
```

FIG. 4C
```
        C  0001 0000 0000 0000 0000
    XOR D  0000 1111 1111 1111 1110
        E  0001 1111 1111 1111 1110
```
Carry Flag / Auxiliary Carry Flag FIG. 4D
```
    >> E  0001 1111 1111 1111 1110
       F  0000 1111 1111 1111 1111
```

FIG. 4E
```
        E  0001 1111 1111 1111 1110
    XOR F  0000 1111 1111 1111 1111
           0001 0000 0000 0000 0001
```
Overflow Flag

METHOD AND APPARATUS FOR EMULATING STATUS FLAG

FIELD OF THE INVENTION

The invention relates to computer systems, and, in particular, to the emulation of setting status flags in a computer architecture that does not include native support for status flags.

BACKGROUND OF THE INVENTION

Most often, computer programs are initially written in high-level program statements. In order to be executed by a computer, the program statements are compiled into machine instructions that a microprocessor can recognize and execute. The machine instructions are selected from a set of machine instructions unique to a particular Instruction Set Architecture (ISA).

In the field of ISAs, there have arisen two fundamentally different types of instruction sets: the Complex Instruction Set Computer architecture (CISC) and the Reduced Instruction Set Computer architecture (RISC). The CISC architecture utilizes an instruction set that allows for complicated and flexible ways of calculating such elements as memory addresses. One of the defining characteristics of the CISC architecture is the use of variable length instructions, which adds additional complexity to the decoding hardware. Although very powerful, all the complexity of the CISC instruction set usually requires additional clock cycles to execute each machine instruction.

A RISC processor, on the other hand, is designed to operate more efficiently by processing a relatively smaller set of instructions. The RISC design is based on the premise that most of the instructions a computer decodes and executes are simple. As a result, RISC architecture limits the number of instructions that are built into the microprocessor, and optimizes each so it can be carried out very rapidly, usually within a single clock cycle.

It is possible for computer program statements that have been compiled into machine instructions for a CISC processor to be translated in order to be executed on a RISC processor. This translation process is normally carried out by a binary translator, which typically consists of a set of instructions stored in memory.

The RISC machine executes the translated instructions by using the RISC instruction set to emulate how the untranslated instructions would be executed on a CISC processor. Practitioners in the art will understand, that when a RISC processor emulates a CISC program, many of the inherent performance advantages of the RISC processor are missed.

Consider, for example, integer arithmetic instructions. Typically on a CISC processor, when an arithmetic instruction is executed a set of status flags are set, each of which indicate a different dimension of the result generated by the arithmetic instruction. Once the status flags are set, a conditional instruction can evaluate a logical combination of the status flags to determine whether the condition of the conditional instruction is met.

One ISA includes the following flags. A Carry Flag (CF), which is set if an arithmetic operation generates a carry or borrow out of the most significant bit. An Auxiliary Carry Flag (AF), which is set if there is a carry or borrow out of the fourth bit position (typically used in performing Binary-coded decimal arithmetic). And, an Overflow Flag (OF), which indicates the result is too large or too small to be represented in the number of bits allocated to store the result.

The instruction set of a RISC ISA, however, typically does not include instructions dedicated to setting status flags. Therefore, the RISC ISA emulates generating a status flag by employing a series of instructions provided in the RISC instruction set. Practitioners in the art will understand, that the greater the number of instructions needed to emulate an untranslated instruction, the less efficient the method of emulation.

For example, consider one method of emulating the generation the CF, AF, and an OF for a 32-bit integer add operation performed on a 32-bit architecture. The method requires eight instructions to emulate what is typically done in one instruction on the CISC ISA. For example, as shown below in table 1, a first instruction performs the arithmetic operation specified by the instruction. The first instruction adds two 32-bit operands to generate a sum. A second instruction then begins emulating the status flags. The second instruction compares the sum generated by the first instruction to one of the operands, as an unsigned operand If the sum is less than the operand, a carry has been generated by the add operation (i.e. the most significant bit (MSB) of the sum has been carried out of the field allocated for storing the result).

TABLE 1

| Instruction 1 | A<br>B + | (1111 1111 1111 1111 1111 1111 1111 1111)<br>(0000 0000 0000 0000 0000 0000 0000 0001) |
|---|---|---|
| Instruction 2 | C<br>A > C = CF Set | (0000 0000 0000 0000 0000 0000 0000 0000) |

To determine the AF, as shown below in table 2, a third and fourth instruction are respectively used to mask the sum and mask one of the operands down to the least significant four bits. A fifth instruction is then used to compare the remaining four bits of the masked sum with the remaining four bits of the masked operand. Once again, if the sum is less than the operand, an auxiliary carry has been generated.

TABLE 2

| Instruction 3 | A<br>& 0xf | (1111 1111 1111 1111 1111 1111 1111 1111)<br>(0000 0000 0000 0000 0000 0000 0000 1111) |
|---|---|---|
| Instruction 4 | D<br>C<br>& 0xf | (0000 0000 0000 0000 0000 0000 0000 1111)<br>(0000 0000 0000 0000 0000 0000 0000 0000)<br>(0000 0000 0000 0000 0000 0000 0000 1111) |
| Instruction 5 | E<br>D > E = Set AF | (0000 0000 0000 0000 0000 0000 0000 0000) |

Those in the art will further understand that if the operands are treated as signed operands, then it may be determined whether the arithmetic operation has generated an overflow. That is, if the sum generated by adding two operands having the same sign bits, has a different sign bit from the two input operands (e.g., (not A[32] XOR B[32]) XOR C[32]), an overflow has been generated.

As a result, to emulate generating an overflow flag, three additional instructions are typically used. For example, as shown below in table 3, a sixth instruction generates the invert of one of the input operands. A seventh instruction performs a first logical exclusive-or operation (XOR) between the inverted operand and the remaining input operand. An eighth instruction performs a second XOR operation between the result of the first XOR operation and the sum generated by adding the two operands. The result of the second XOR indicate whether an overflow has been generated by adding the two inputs.

TABLE 3

| Instruction 6 | not A | (1111 1111 1111 1111 1111 1111 1111 1111) |
|---|---|---|
| Instruction 7 | F | 0000 0000 0000 0000 0000 0000 0000 0000 |
| | B | (0000 0000 0000 0000 0000 0000 0000 0001) |
| | XOR F | (0000 0000 0000 0000 0000 0000 0000 0000) |
| Instruction 8 | G | (0000 0000 0000 0000 0000 0000 0000 0001) |
| | G | (0000 0000 0000 0000 0000 0000 0000 0001) |
| | XOR C | (0000 0000 0000 0000 0000 0000 0000 0000) |
| | H | (0000 0000 0000 0000 0000 0000 0000 0001) |

Therefore, as will be appreciated by one skilled in the art, there is a need for a more efficient method and apparatus for emulating status flags.

SUMMARY AND OBJECTS OF THE INVENTION

The present invention provides a method and apparatus for emulating status flags on a computer system that has no native support for status flags. One embodiment of the invention includes decoding an arithmetic instruction executable on a first Instruction Set Architecture (ISA), wherein the instructions generates at least one status flag when executed on the first ISA. The arithmetic instruction is then translated to be executable on a second ISA. When executed on the second ISA, the translated arithmetic instruction generates a first intermediate result by performing a first logical exclusive-or (XOR) operation between a first operand and a second operand. The arithmetic instruction then generates a first final result by performing a second XOR operation between the first intermediate result and an arithmetic result, which was generated by an arithmetic operation specified by the arithmetic instruction. As a result, the first final result has at least one bit representing a status flag of the arithmetic result.

BRIEF DESCRIPTION OF THE DRAWINGS

The present invention is illustrated by way of example and not limitation in the figures of the accompanying drawings, in which like references indicate similar elements, and in which:

FIGS. 4(a)–(e) illustrates emulating status flags according to one embodiment of the present invention.

DETAILED DESCRIPTION

A method and apparatus are described for emulating of status flags on a computer system that has no native support for status flags.

One embodiment of the present invention is provided in part via a binary translator that translates instructions that are executable on a source instruction set architecture that includes support for status flags, into instructions that are executable on a target architecture instruction set that has no native support for status flags. For example, the source architecture instruction set may be the instruction set of either a CISC architecture or another architecture having native support for status flags, and the target architecture instruction set may be the instruction set of a RISC, Very Long Instruction Word computer (VLIW), or another computer architecture that has no native support for status flags.

Figure 1:
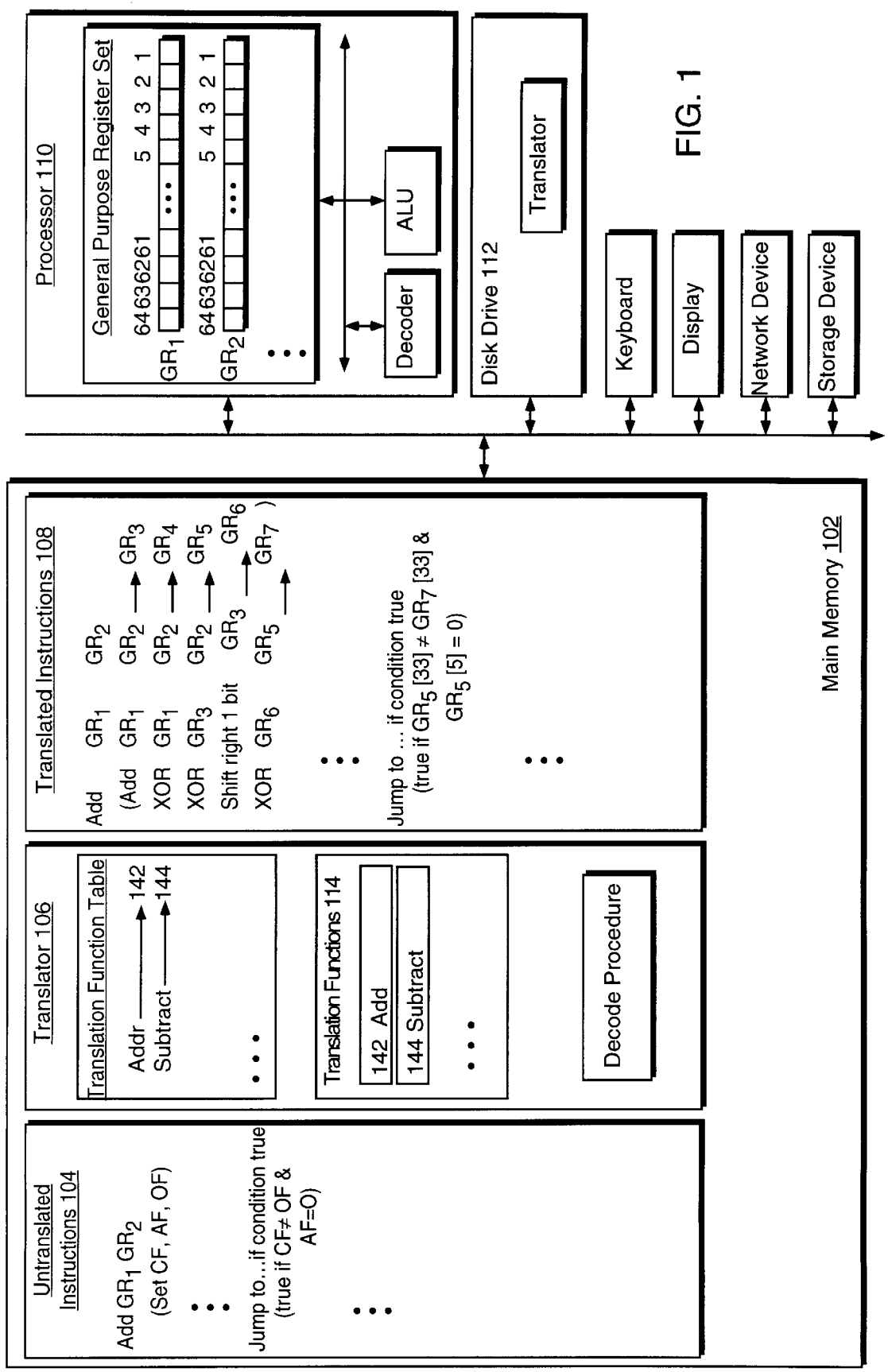
FIG. 1 illustrates a computer system implementing the present invention according to one embodiment.

FIG. 1 illustrates an exemplary a computer system implementing the present invention according to one embodiment, and which capable of operating on operands greater than 32-bits in length. Shown in the memory 102 of FIG. 1, the untranslated instructions 104 shown consists of instructions compiled to be executed on a processor that includes native support for setting status flags (e.g. CISC ISA).

In order to have the instructions in the untranslated instructions 104 executed on a processor 110 that does not have native support for setting status flags, the untranslated instructions are translated by the translator 106 shown in the memory 102 of FIG. 1. The translation process of the present invention may be performed dynamically during the execution of untranslated instructions or statically when the untranslated instructions are not being executed. Moreover, in alternative embodiments, the translator 106 of the present invention may be stored on other computer-readable mediums, including magnetic and optical disk, and other random-access memory devices, accessible via the disk drive 112 shown in FIG. 1.

During the translation process, each untranslated instruction is first decoded into an opcode and operands by a decode procedure, shown stored in the translator of FIG. 1. The decoded instruction is then translated by one of the translation functions also shown in the translator.

In one embodiment, when translating the instructions dynamically, a hash value of an untranslated instruction's opcode can be used to index the Translation Function Table shown in the translator. The table in turn may provide the address of a translation function corresponding to the opcode of the untranslated instruction. For example, the opcode of an untranslated integer add instruction may hash to a table entry containing the address of a translation capsule that is able to translate the integer add instruction.

In turn, the translation function corresponding to an untranslated instruction provides a sequence of instructions from the target architecture instruction set which emulate how the untranslated instruction would be executed on the source ISA. In particular, one embodiment of the present invention is able to emulate a 32 bit integer add/subtract operation and emulate generating a Carry Flag, an Auxiliary Flag, and an Overflow Flag, with only five instructions, when eight instructions are needed to emulate the same status flags in at least one prior art method.

Once the untranslated instructions 104 have been translated to be executable on the target ISA, they are stored in the area of memory allocated for storing translated instructions 108. It will be appreciated by those skilled in the art that the dynamic or static translation technique used to translate the untranslated instructions may vary without departing from the scope of the invention, which includes providing a more efficient method and apparatus for emulating the status flags.

Figure 2:
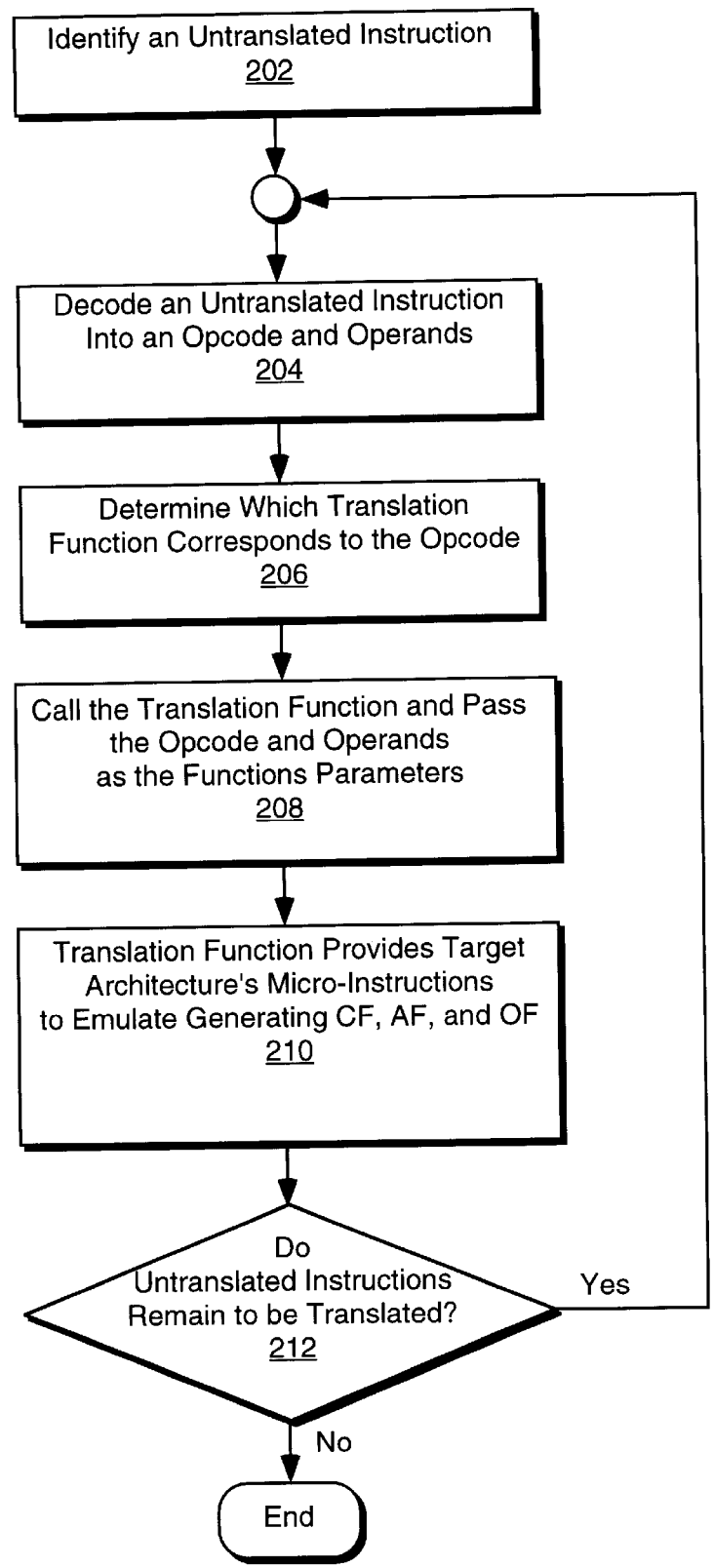
FIG. 2 is a flow diagram describing the steps of translating instructions according to one embodiment of the present invention.

FIG. 2 illustrates a flow diagram describing the steps of emulating the status flags according to one embodiment of the present invention. In block 202, a program counter identifies an untranslated instruction that is to be translated so as to be executed on the target architecture instruction set.

In block 204, the untranslated instruction is decoded by the translator into an opcode and operands. The opcode indicates an operation to be performed by the untranslated instruction, and the operands identify a register, cache, or memory location storing data to be operated on by the opcode.

In one embodiment of the present invention, the instruction is decoded by a procedure that includes a separate sequence of instructions stored in the translator. In alternative embodiments, the untranslated instructions can be decoded by a procedure stored in memory outside the translator or provided via a hardware component.

In block 206, the translator selects a translation function that corresponds to the opcode of the untranslated instruction. The functions are selected from a set of translation functions stored in the translator. Each translation function provides a separate sequence of instructions in place of the untranslated instruction's opcode in order to emulate execution of the untranslated instruction on the target computer architecture. The instructions provided from the translation function are selected from the instruction set of the target architecture.

In addition, in one embodiment, the translation functions translate the memory addresses of the untranslated instruction's operands to be compatible with the memory addresses of the target architecture. The translation may consist of adding the untranslated instruction's operands to an offset base address of the target architecture.

In one embodiment, the translation capsules are indexed in a table by a hash value of the opcodes from the source computer architecture instruction set (e.g., the 12 least significant bits of each opcode). Each entry in the table includes the address of the translation function corresponding to the opcode, and may include other information regarding the translation capsule, such as whether the opcode takes memory operands.

In block 208, the selected translation capsule function is called and receives the untranslated instruction's operands and opcode as its parameters. In response, the capsule provides a series of instructions in place of the untranslated instruction's opcode, translates the memory addresses of the untranslated instruction's operands, and stores the results in an area of memory allocated to store translated instructions.

In one embodiment, if the instruction being translated is a 32-bit integer addition or subtraction instruction, in block 210 the respective translation function provides a series of instructions to perform the arithmetic operation and emulate generating at least a Carry Flag, Auxiliary carry Flag, and Overflow Flag of the CISC ISA.

In particular, one embodiment of the present invention is able to emulate the arithmetic operation and generate the Carry Flag and Auxiliary carry Flag in only three instructions, and is further able to generate an Overflow Flag with two additional instructions. In at least one prior art method, five instructions are needed to emulate the arithmetic operation and generate the Carry Flag and Auxiliary carry Flag, and three additional instructions are necessary to emulate generating an Overflow Flag.

Figure 3:
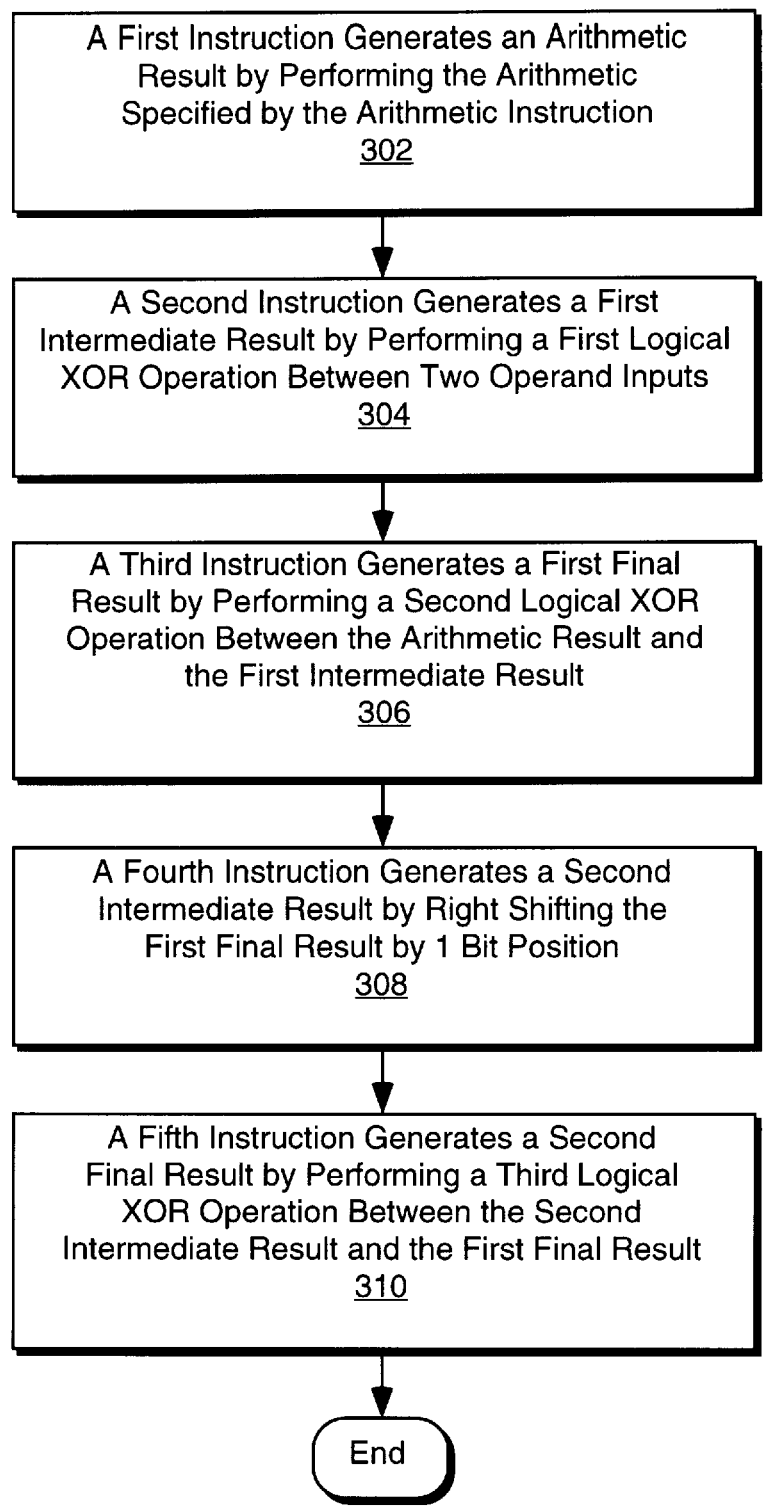
FIG. 3 is a flow diagram describing the steps of emulating status flags according to one embodiment of the present invention.

Referring to FIG. 3, a flow diagram is shown describing the execution of a set of instructions provided by the present invention to emulate an arithmetic instruction generating the Carry Flag, Auxiliary carry Flag, and Overflow Flag. The steps described in the flow diagram of FIG. 3 are further illustrated in an exemplary sixteen bit operand arithmetic operation shown in FIGS. 4(a)–(e).

In step 302, illustrated in FIG. 4(a), a first instruction performs an arithmetic operation between a first and second operand (A & B) to generate an arithmetic result (C), as specified by the opcode of the untranslated instruction. In step 304, illustrated in FIG. 4(b), a second instruction perform a first logical XOR operation between the first and second operands (A & B) to generate a first intermediate result (D). In step 306, illustrated in FIG. 4(c), a third instruction generates a first final result (E) by performing a second logical XOR operation between the arithmetic result (C) and the first intermediate result (D).

As a result, each bit of the first final result respectively represents whether a carry has been generated by the arithmetic operation performed between the next less significant bits of the first and second operands. For example, the 33rd bit of the first final result represents whether a carry (e.g. Carry Flag) was generated by adding the first 32 bits of the first and second operands. Moreover, the 5th bit of the first final result represents whether a carry (e.g. Auxiliary carry Flag) was generated by performing the arithmetic operation between the first 4 bits of the first and second operands. It will be apparent to those skilled in the art that the first final result generated by the present invention can also be used to generate additional status flags representing whether a carry has been generated for additional bit positions.

One embodiment of the present invention is implemented on a computer architecture that is performs operations on operands greater than 32-bits. Retaining at least the 33rd bit of a result generated by performing an arithmetic operation between two 32-bit operands allows the present invention to determine whether a carry is generated by the 32-bit operation.

To emulate generating an overflow flag, one embodiment of the present invention determines if the bit that is one greater than the MSB of the first final result (E) is different from the MSB of the first final result (e.g. 33rd bit≠32nd bit). Therefore, to generate the overflow flag, in step 308, illustrated in FIG. 4(d), a fourth instruction generates a second intermediate result (F) by right shifting the first final result (E) by one bit position.

In step 310, illustrated in FIG. 4(e), a fifth instruction generates a second final result (G) by performing a third logical XOR operation between the second intermediate result (F) and the first final result (E). As a result, if the MSB (e.g. 32nd bit) of the second final result is set to one, than the arithmetic result (C) generated by the first instruction has generated an overflow. Moreover, each bit of the second final result (G) represents whether an overflow has been generated by the arithmetic operation for the corresponding bit position of the first final result. Therefore, the remaining bits of the second final result (G) can be used to represent overflow flags for bit positions other than the 32nd bit.

Shown in the memory 102 of FIG. 1, is an example of the present invention translating an arithmetic instruction. As shown in the untranslated instructions, an add instruction compiled to be executed on the source architecture may include the operations of (add the contents of general register 1 (GR1) to the contents of GR2 and update status flags CF, AF, and OF).

Once the arithmetic instruction has been translated by the present invention, as shown in the translated instructions, the translated arithmetic instruction may include the following additional operations to emulate updating the status flags (Add GR1 to GR2 and store in GR3; XOR GR1 with GR2 and store in GR4; XOR GR3 with GR4 and store in GR5; shift right 1 bit GR3 and store in GR6; and, XOR GR6 with GR5 and store in GR7).

Thereafter, a translated conditional instruction can read a particular bit field of either final result to determine if a particular carry bit or overflow bit, or a logical combination thereof, have been generated by the arithmetic instruction. It will be appreciated by those skilled in the art that computer architectures that have no native support for status flags are able to read bit fields of registers or memory address locations by using either a sequence of instructions or a single instruction that has the ability to read bit fields.

Returning to FIG. 2, in decision block 212, it is determined whether additional untranslated instructions remain to be translated. If any instructions remain to be translated, the remaining instructions are translated in steps similar to those described in blocks 202–212.

In an alternative embodiment, the instructions provided by the present invention to emulate an integer arithmetic operation and emulate status flags may be scheduled to be executed in parallel when the present invention is performed on a computer system having a processor that is able to execute multiple instructions per clock cycle. This type of processor is commonly referred to as a superscalar processor.

The parallel execution is performed by identifying a group of instructions that do not depend on each other, or require use of the same functional unit. These instructions are then scheduled to be executed in the same clock cycle. For example, in one embodiment of the present invention, the first instruction which generates an arithmetic result (C), and the second instruction which generates the first intermediate result (D) by performing the first logical XOR operation can be executed in parallel.

In the foregoing specification, the invention has been described with reference to specific exemplary embodiments thereof. It will, however, be evident that various modifications and changes may be made thereto without departing from the broader spirit and scope of the invention. For instances where it has been shown that the binary translator, the untranslated program, and the translated instructions are stored in memory, these items and instructions can also be stored on other computer-readable mediums, including magnetic and optical disk, and other random-access memory devices.

What is claimed is:

1. A computer-implemented method comprising the steps of:
   a) decoding an arithmetic instruction executable on a first Instruction Set Architecture (ISA), the arithmetic instruction generating at least one status flag when executed on the first ISA; and
   b) translating the arithmetic instruction to be executable on a second ISA, wherein the arithmetic instruction is translated to perform the following steps when executed on the second ISA:
   b1) generating a first intermediate result by performing a first logical exclusive-or (XOR) operation between a first operand and a second operand; and
   b2) generating a first final result by performing a second XOR operation between the first intermediate result and an arithmetic result, the arithmetic result being generated by an arithmetic operation specified by the arithmetic instruction, said first final result having at least one bit representing a status flag of the arithmetic result.

2. The computer-implemented method of claim 1, wherein said one bit of the first final result represents whether a carry was generated by the arithmetic operation.

3. The computer-implemented method of claim 2, wherein at least two bits of the first final result each represent separate status flags of the arithmetic result.

4. The computer-implemented method of claim 3, wherein the step of translating the arithmetic instruction to be executable on the second ISA further includes translating the arithmetic instruction to perform the additional steps when executed on the second ISA:
   c) generating a second intermediate result by shifting the first final result; and
   d) generating a second final result by performing a third logical XOR operation between the first final result and the second intermediate result, said second final result having at least one bit representing whether the arithmetic operation generated an overflow.

5. The computer-implemented method of claim 4, wherein the first ISA includes native support for status flags, and the second ISA is exclusive of native support for status flags.

6. The computer-implemented method of claim 5, wherein the first ISA consist of a 32-bit instruction set architecture, and the second ISA consist of an instruction set architecture capable of operating on operands greater than 32-bits.

7. The computer-implemented method of claim 6, wherein each bit of the first final result respectively represents whether a carry has been generated at a corresponding bit position in the arithmetic result.

8. The computer-implemented method of claim 7, wherein at least a 9th, 17th, or 33rd bit of the first final result can respectively represent a Carry Flag of a Complex Instruction Set Architecture for an eight bit, sixteen bit, and thirty-two bit arithmetic operation, and at least a 5th bit of the final result can represent an Auxiliary Flag of a Complex Instruction Set Architecture.

9. The computer-implemented method of claim 7, wherein each bit of the second final result represents whether an overflow was generated at a corresponding bit position in the second final result.

10. The computer-implemented method of claim 9, wherein a 32nd bit of the second final result represents an Overflow Flag of a Complex Instruction Set Architecture.

11. A computer-readable medium having stored thereon a plurality of instruction including a first set of instructions, which when executed by a processor, cause said processor to perform a process comprising of:
    a) decoding an arithmetic instruction executable on a first Instruction Set Architecture (ISA), the arithmetic instruction generating at least one status flag when executed on the first ISA; and
    b) translating the arithmetic instruction to be executable on a second ISA, wherein the arithmetic instruction is translated to perform the following steps when executed on the second ISA:
    b1) generating a first intermediate result by performing a first logical exclusive-or (XOR) operation between a first operand and a second operand; and
    b2) generating a first final result by performing a second XOR operation between the first intermediate result and an arithmetic result, the arithmetic result generated by an arithmetic operation specified by the arithmetic instruction, said first final result having at least one bit representing a status flag of the arithmetic result.

12. The computer-readable medium of claim 11, wherein said one bit of the first final result represents whether a carry was generated by the arithmetic operation.

13. The computer-readable medium of claim 12, wherein at least two bits of the first final result each represent separate status flags of the arithmetic result.

14. The computer-readable medium of claim 13, wherein the step of translating the arithmetic instruction to be executable on the second ISA further includes translating the arithmetic instruction to perform additional steps when executed on the second ISA, the additional steps comprising of:

c) generating a second intermediate result by shifting the first final result; and d) generating a second final result by performing a third logical XOR operation between the first final result and the second intermediate result, said second final result having at least one bit representing whether the arithmetic operation generated an overflow.

15. The computer-readable medium of claim 14, wherein the first ISA includes native support for status flags, and the second ISA is exclusive of native support for status flags.

16. The computer-readable medium of claim 15, wherein the first ISA consist of a 32-bit instruction set architecture, and the second ISA consist of an instruction set architecture capable of operating on operands greater than 32-bits.

17. The computer-readable medium of claim 16, wherein each bit of the first final result respectively represents whether a carry has been generated at a corresponding bit position in the arithmetic result.

18. The computer-readable medium of claim 17, wherein at least a 9th, 17th, or 33rd bit of the first final result can respectively represent a Carry Flag of a Complex Instruction Set Architecture for an eight bit, sixteen bit, and thirty-two bit arithmetic operation, and at least a 5th bit of the final result can represent an Auxiliary Flag of a Complex Instruction Set Architecture.

19. The computer-readable medium of claim 17, wherein each bit of the second final result represents whether an overflow was generated at a corresponding bit position in the second final result.

20. The computer-readable medium of claim 19, wherein a 32nd bit of the second final result represents an Overflow Flag of a Complex Instruction Set Architecture.

21. A computer system comprising of:

a decoder configured to decode an arithmetic instruction executable on a first Instruction Set Architecture (ISA), the instruction generating at least one status flag when executed on the first ISA; and a translator coupled to the decoder, the translator configured to translate the arithmetic instruction to be executable on a second ISA, the translated arithmetic instruction, when executed on the second ISA, generates a first intermediate result by performing a first logical exclusive-or (XOR) operation between a first operand and a second operand; and generates a first final result by performing a second XOR operation between the first intermediate result and an arithmetic result, the arithmetic result generated by an arithmetic operation specified by the arithmetic result, first final result having at least one bit representing a status flag of the arithmetic result.

22. The computer system of claim 21, wherein said one bit of the first final result represents whether a carry was generated by the arithmetic operation.

23. The computer system claim 22, wherein at least two bits of the first final result each represent separate status flags of the arithmetic result.

24. The computer system of claim 23, wherein the translated arithmetic instruction, when executed on the second ISA further, further generates a second intermediate result by shifting the first final result; and generates a second final result by performing a third logical XOR operation between the first final result and the second intermediate result, said second final result having at least one bit representing whether the arithmetic operation generated an overflow.

25. The computer system of claim 24, wherein the first ISA includes native support for status flags, and the second ISA is exclusive of native support for status flags.

26. The computer system of claim 25, wherein the first ISA consist of a 32-bit instruction set architecture, and the second ISA consist of an instruction set architecture capable of operating on operands greater than 32-bits.

27. The computer system of claim 26, wherein each bit of the first final result respectively represents whether a carry has been generated at a corresponding bit position in the arithmetic result.

28. The computer system of claim 27, wherein at least a 9th, 17th, or 33rd bit of the first final result can respectively represent a Carry Flag of a Complex Instruction Set Architecture for an eight bit, sixteen bit, and thirty-two bit arithmetic operation, and at least a 5th bit of the final result can represent an Auxiliary Flag of a Complex Instruction Set Architecture.

29. The computer system of claim 27, wherein each bit of the second final result represents whether an overflow was generated at a corresponding bit position in the second final result.

30. The computer system of claim 29, wherein a 32nd bit of the second final result represents an Overflow Flag of a Complex Instruction Set Architecture.

* * * * *